United States Patent Office 3,824,258
Patented July 16, 1974

3,824,258
3-OXABICYCLO-[10.3.0]PENTADECENE-(6) AND ITS PREPARATION
Erich Klein and Albrecht Roth, Holzminden, Germany, assignors to Dragoco Spezialfabrik Konz. Riech- und Aromastoffe Gerberding & Co. GmbH
No Drawing. Filed June 30, 1972, Ser. No. 268,091
Claims priority, application Germany, Feb. 28, 1972, P 22 09 372.7
Int. Cl. C07d 5/32
U.S. Cl. 260—346.2 R
9 Claims

ABSTRACT OF THE DISCLOSURE

The novel compound 3-oxabicyclo-[10.3.0]pentadecene-(6) is prepared by reacting cyclododecene with paraformaldehyde in the presence of a Lewis acid as the catalyst. The product is useful as an odorant per se and in perfume compositions.

---

This invention relates to 3-oxabicyclo[10.3.0]pentadecene-(6) having the formula:

as well as to a process for the preparation thereof. The invention also relates to the use of this compound in odorant compositions.

The novel oxabicyclopentadecene compound of this invention exhibits an intensive, strongly adhering and thus long-lingering scent, reminiscent of the odor of the valuable natural musk and native storax, but additionally exhibiting a strongly wooden or ligneous odoriferous character. A considerable demand exists for such substances in the perfume industry, especially since such odoriferous materials are only available from natural sources in rather limited amounts and in strongly differing qualities.

Accordingly, one of the objects of the present invention is to provide a novel compound and compositions containing the same which have great utility in the field of odorants and perfumes.

Another object of the present invention is to provide a process for producing a novel oxabicyclopentadecene compound.

A further object of the invention is to provide a novel organic compound which is made synthetically and with consistent quality for use as a perfume in perfume compositions or as a scent-fixing and intensifying agent.

These and other objects and advantages of the present invention will become apparent to those skilled in the art from a consideration of the following specification and claims.

In accordance with the present invention, 3-oxabicyclo-[10.3.0]pentadecene-(6) is prepared from cyclododecene. The cyclododecene is obtained in a conventional manner by the dehydration of cyclododecanol. In a preferred embodiment of this invention, the cyclododecene is dissolved in glacial acetic acid and is reacted with paraformaldehyde in the presence of a Lewis acid as the catalyst. The 3-oxabicyclo-[10.3.0]-pentadecene-(6) product is formed in a good yield by this procedure.

The Lewis acid used as the catalyst can be either inorganic or organic. Examples thereof include sulfuric acid, phosphoric acid, perchloric acid, zinc chloride, p-toluenesulfonic acid and benzenesulfonic acid. The concentration of catalysts employed can vary between 5 and 20% by weight, based upon the amount of cyclododecene utilized.

The paraformaldehyde is employed in the reaction of the present invention in an at least equimolar amount, but preferably in an excess amount.

In general, the reaction is conducted at a temperature of from about 90° to 110° C. The amount of reaction time ranges between approximately five and seven hours, depending upon the particular catalyst employed. The reaction of olefins in glacial acetic acid with paraformaldehyde, catalyzed by a Lewis acid, has been known for a long time in the art under the name of the "Prins Reaction"; note The Merck Index, Eighth Edition (1968), page 1204 under the heading "Organic Name Reactions," wherein it is stated that the Prins Reaction is the acid-catalyzed reaction of aldehydes with olefins to form 1,3-glycols or their derivatives. However, in this reaction, the primary reaction products are always mixtures of, in part, polyhydric alcohols, their acetates and 1,3-dioxane derivatives. Therefore, it is surprising and could not be expected that the "Prins Reaction" in the case of cyclododecene would yield an oxabicyclopentadecene compound as the main product. Apart from the unexpected course of the reaction, the conditions employed in the process of this invention correspond to the conditions customarily used in the "Prins Reaction."

As noted above, the novel oxabicyclopentadecene derivative of the present invention is especially suitable for use as a perfume material, as an odor modifier and fixative as well as for the production of perfume compositions. In this connection, a very advantageous property is the great intensity and clinging strength of the odor of this substance. Hence, the present invention also involves odorant or perfume compositions containing 3-oxabicyclo[10.3.0]pentadecene-(6) as the active component. The concentration of the novel compound of this invention in such compositions can be determined by one skilled in the perfume art in the usual manner and will depend upon the desired utility in a particular case.

The following examples are given merely as illustrative of preferred embodiments of the present invention and are not to be considered as limiting.

EXAMPLE 1

Preparation of 3-Oxabicyclo[10.3.0]pentadecene-(6)

A mixture of 1650 grams of glacial acetic acid, 100 grams of benzenesulfonic acid and 1660 grams (10 moles) of cyclododecene is introduced into an agitator and is heated to 100° C. Within about 5 hours, 500 grams (16.7 moles) of paraformaldehyde is added batchwise under thorough agitation, the temperature being maintained at 100° C. during this procedure. The reaction mixture is further agitated at the same temperature for 2 hours, then diluted with 2 liters of water, extracted with a total of 4 liters of peroleum ether (boiling point: 60–100° C.), and washed neutral with NaHCO₃ solution. After drying the reaction mixture over sodium sulfate and evaporation of the solvent under a vacuum, a yield of crude product of 2071 grams is obtained. Subsequent vacuum distillation (at 1 mm. Hg) results in the recovery of 500 grams of cyclododecene and 1070 grams of 3-oxabicyclo-[10.3.0]-pentadecene-(6) as the product.

This product is a relatively viscous, colorless to slightly yellowish liquid having an intensive, pleasant scent. It exhibits a boiling point of 114–116° C. at 1.0 mm. Hg, $n_D^{20°}: 1.5028, d_4^{20°}: 0.9705.$ The NMR, IR and mass spectra are in complete conformity with the described structure.

EXAMPLE 2

A perfume composition having a flowery scent is prepared by mixing the following components in the indicated proportions:

| Components: | Parts by Weight |
|---|---|
| Benzyl acetate | 22 |
| Hydroxycitronellal | 22 |
| Phenylethyl alcohol | 15 |
| α-Amylcinnamic aldehyde | 5 |
| Linalool | 5 |
| Dihydrojasmone | 2 |
| Ylang ylang oil | 2 |
| Methylionone | 1 |
| Geraniol | 6 |
| Eugenol | 0.4 |
| Benzyl benzoate | 3.6 |
| Benzyl salicylate | 6 |

To this mixture is added 10 parts by weight of 3-oxabicyclo[10.3.0]pentadecene-(6), whereby the scent of this composition is enhanced in a clearly noticeable manner, and the fixing and intensifying properties of this composition are considerably improved.

EXAMPLE 3

Another perfume composition is produced by mixing the following components in the proportions set forth below:

| Components: | Parts by Weight |
|---|---|
| Dihydrocoumarin | 15 |
| Sandalwood oil, East Indian | 22 |
| Hydroxycitronellal | 22 |
| γ-Methylinone | 22 |
| Bergamot oil | 3 |
| Vetiveryl acetate | 2 |
| Guaiyl acetate | 4 |
| Ethyl vanillin | 0.4 |
| Patchouli oil | 0.3 |
| Citronella oil | 0.3 |

By the addition of 9 parts by weight of 3-oxabicyclo-[10.3.0]pentadecene-(6), a scent with a pronounced fine wood fragrance characteristic is imparted to this mixture.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:
1. 3-Oxabicyclo[10.3.0]pentadecene-(6) of the formula:

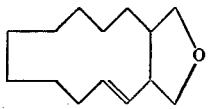

2. A process for the preparation of 3-oxabicyclo-[10.3.0]pentadecene-(6) which comprises reacting cyclododecene with paraformaldehyde in the presence of a Lewis acid as the catalyst.

3. The process of Claim 2, wherein the reaction is conducted in the presence of glacial acetic acid as the solvent.

4. The process of Claim 2, wherein the Lewis acid is selected from the group consisting of sulfuric acid, phosphoric acid, perchloric acid, zinc chloride, p-toluenesulfonic acid and benzenesulfonic acid.

5. The process of Claim 2, wherein the concentration of catalyst employed is about 5 to 20% by weight, based on the amount of cyclododecene.

6. The process of Claim 2, wherein at least an equimolar amount of paraformaldehyde is reacted with the cyclododecene.

7. The process of Claim 2, wherein the reaction is conducted at a temperature of approximately 90° to 110° C.

8. A process for the preparation of 3-oxabicyclo-[10.3.0]pentadecene-(6) which comprises reacting cyclododecene with paraformaldehyde in glacial acetic acid in the presence of a catalytic amount of a Lewis acid at a temperature of approximately 90° to 110° C.

9. The process of Claim 8, wherein about 5 to 20% by weight, based on the amount of cyclododecene, of a Lewis acid selected from the group consisting of sulfuric acid, phosphoric acid, perchloric acid, zinc chloride, p-toluenesulfonic acid and benzenesulfonic acid is employed as the catalyst.

References Cited
UNITED STATES PATENTS
3,532,720  10/1970  Stapp  260—346.2

HENRY R. JILES, Primary Examiner
B. DENTZ, Assistant Examiner

U.S. Cl. X.R.
252—522